(12) United States Patent
Trinh

(10) Patent No.: US 6,932,198 B2
(45) Date of Patent: Aug. 23, 2005

(54) BRAKE ASSEMBLY AND A METHOD FOR BRAKING A VEHICLE OR ANOTHER SELECTIVELY MOVABLE ASSEMBLY

(75) Inventor: Minh Trac Trinh, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 313 days.

(21) Appl. No.: 10/064,686

(22) Filed: Aug. 7, 2002

(65) Prior Publication Data

US 2004/0026183 A1 Feb. 12, 2004

(51) Int. Cl.[7] .......................... F16D 55/14; F16D 55/26
(52) U.S. Cl. ................................. 188/72.7; 188/72.2
(58) Field of Search .............................. 188/72.7, 72.2

(56) References Cited

U.S. PATENT DOCUMENTS

| | | | | |
|---|---|---|---|---|
| 3,662,864 A | * | 5/1972 | Evans ........................ | 188/72.2 |
| 3,850,268 A | * | 11/1974 | Guettier ...................... | 188/72.2 |
| 4,352,415 A | * | 10/1982 | Powell ........................ | 188/156 |
| 4,458,789 A | * | 7/1984 | Cole .......................... | 188/71.5 |
| 4,736,820 A | * | 4/1988 | Price et al. ................. | 188/71.4 |
| 6,318,513 B1 | * | 11/2001 | Dietrich et al. ............. | 188/72.7 |
| 6,332,514 B1 | * | 12/2001 | Chen .......................... | 188/72.7 |
| 6,491,138 B1 | * | 12/2002 | Spagele ...................... | 188/70 B |

FOREIGN PATENT DOCUMENTS

| | | | | |
|---|---|---|---|---|
| DE | 4040016 A1 | * | 2/1992 | ........... B66B/11/00 |
| EP | 0 953 785 A3 | | 4/1999 | |

* cited by examiner

*Primary Examiner*—Robert A. Siconolfi
(74) *Attorney, Agent, or Firm*—Gary Smith

(57) ABSTRACT

A brake assembly (10) which provides a controllably varying amount of self-energization by the dynamic adjustment of the position of a wedge member (22) which is based upon a measured amount of friction which exists between a pad assembly (14) and a rotor (12).

13 Claims, 2 Drawing Sheets

BRAKE ASSEMBLY AND A METHOD FOR BRAKING A VEHICLE OR ANOTHER SELECTIVELY MOVABLE ASSEMBLY

BACKGROUND OF INVENTION

1. Field of the Invention

The present invention generally relates to a brake assembly and to a method for braking a vehicle or another selectively movable assembly and more particularly, to a brake assembly which provides a controllably varying amount of self-energization.

2. Background of the Invention

A self-energizing braking system, such as and without limitation that which is shown and described in European Patent Number EP 0953785A3 which is fully and completely incorporated herein by reference, word for word and paragraph for paragraph, generally includes an actuator (e.g., a motor) which selectively provides an actuation force in response to a sensed movement or depression of a braking member, and a self-energization member having at least one wedge portion having a certain fixed angle of inclination which assists in the braking of the selectively movable assembly (e.g., a vehicle) within which the braking system is operatively deployed. It should be realized, at the outset, that while the terms vehicle and selectively movable assembly may be interchangeably used throughout this description, nothing in this description is meant to limit the present invention to a particular type of selectively movable assembly, such as a vehicle. In fact, the present invention may be selectively used in a wide variety of selectively movable assemblies, including but not limited to vehicles.

Particularly, the actuation force is typically applied to a pad member and causes the pad member to then engage a portion of the self-energizing braking system (e.g., a rotor) which is attached to a moving wheel, thereby frictionally braking the selectively movable assembly. Particularly, the at least one wedge portion of the self-energization member assists in braking the vehicle (or other selectively movable assembly) by transferring the frictional force (created by the engagement of the pad to the rotor) from a force parallel to the rotor face into a force perpendicular to the rotor face, effectively magnifying the frictional force, thereby desirably reducing the overall actuation force needed to brake the selectively movable assembly in a desired manner. Importantly, the geometric or physical characteristics (e.g., the angle of inclination) of the at least one wedge portion of the self-energization member allows this increase in frictional force to occur without the use of additional actuation energy, thereby conserving energy by actually reducing the overall amount of actuation energy required from the motor and/or from the operator of the vehicle or the selectively movable assembly in order to brake the selectively movable assembly.

The self-energizing braking system can be designed to operate in two different modes. In one, the "compression" mode, the force generated by the motor and/or operator acts on the pad in the same direction as the frictional force. The frictional force pushes the pad into the wedge, increasing the normal force between the pad and the rotor and therefore increasing the friction. In the second, the "tension" mode, the frictional force alone is great enough to engage the brake fully (creating theoretically infinite braking force), and the motor and/or operator pushes in the opposite direction as the friction in an effort to reduce the wedging action and therefore reduce the amount of friction created.

While the foregoing conventional self-energizing braking system does desirably reduce the amount of actuating force needed to brake a selectively movable assembly, it has some drawbacks.

For example and without limitation, this approach does not allow for the use of a relatively low powered motor since the motor must be capable of operating under conditions in which the amount of friction between the rotor and the pad is relatively high and when the amount of friction between the rotor and the pad is relatively low.

For example, in a compression mode of operation, (i.e., in an operational mode in which the direction of rotor travel and the input force to the pad are in the same direction), should the friction be relatively low, the gain obtained from the self-energization is typically undesirably low and the motor must work relatively hard to achieve the desired braking of the vehicle. An undersized motor (e.g., a motor which does not provide enough actuation force to ensure desired operation in high and low friction conditions) may not generate the amount of deceleration required by the operator.

Moreover, should the friction be relatively high while the braking assembly is in a compression mode of operation, the electromechanical braking system may undesirably enter into a tension mode of operation (i.e., a mode in which the direction of rotor travel and the input force to the pad are in opposite directions) which may cause an inconsistent braking feel or may even cause an undesirably high amount of braking force to be generated.

During a tension mode of operation, which occurs when the frictional force is relatively high, an undersized motor may not be able to pull the pad with enough force to prevent it from being frictionally locked onto the rotor. Also, if the friction is too low, while the braking assembly is in a tension mode of operation, the electromechanical braking system may undesirably enter a compression mode of operation.

Hence, a current or conventional self-energization braking configuration provides the desired self-energization by the use of at least one wedge portion having a fixed angle of inclination and being mounted to the pad. As earlier delineated, the fixed inclination angle of the wedge allows the wedge to force the pad against the rotor in order to assist the motor in braking the moving assembly. In the current or conventional self-energization braking configuration, the angle of inclination of the wedge may not be too low since, if it were, a high level of friction could cause the electromechanical braking system to go from a compression mode of operation to a tension mode of operation. This transition from one mode of operation to another can create problems for the controller of the system and may be undesirable. If the wedge angle were too high, the effects of self-energization would be too small, leading to more inefficient use of the motor.

Moreover, as the pad wears during continued operation of the selectively movable assembly, the position of the wedge changes, thereby causing the amount of provided self-energization or "self-energization gain" to uncontrollably vary, causing the system to deviate from the optimum operating levels for energy efficiency.

The present invention addresses these and other drawbacks in a new and novel fashion and represents a braking assembly having a controllably varying amount of self-energization.

SUMMARY OF INVENTION

It is a first non-limiting advantage of the present invention to provide a self-energizing brake assembly which overcomes some or all of the previously delineated disadvantages of prior self-energizing brake assemblies.

It is a second non-limiting advantage of the present invention to provide a method for braking a selectively movable assembly which overcomes some or all of the previously delineated drawbacks of prior braking methodologies.

It is a third non-limiting advantage of the present invention to provide a brake assembly. Particularly, the provided brake assembly includes a selectively movable member which provides a varying amount of self-energization; and a controller assembly, which is coupled to the selectively movable member, which selects a certain amount of self-energization, and which moves the selectively movable member by a certain amount in order to cause the member to provide the certain selected amount of self-energization.

It is a fourth non-limiting advantage of the present invention to provide a brake assembly. Particularly, the brake assembly includes a rotor member; a pad member which may selectively engage the rotor member, thereby generating a certain amount of frictional braking force; a wedge member; and a controller which measures the certain amount of frictional force and, in response to the measurement, selectively moves the wedge member by a predetermined amount, thereby forcing the pad member against the rotor member and generating frictional braking force.

It is a fifth non-limiting advantage of the present invention to provide a method for braking a vehicle. Particularly, the method includes the steps of sensing a desired amount of braking; providing a certain actuation force; selecting a certain amount of self-energization; providing the certain amount of self-energization; using the provided actuation force and the certain amount of self-energization to brake the vehicle.

These and other features, and advantages of the present invention will become apparent from a consideration of the following detailed description of the preferred embodiment of the invention and by reference to the following drawings.

DETAILED DESCRIPTION

Figure 1:
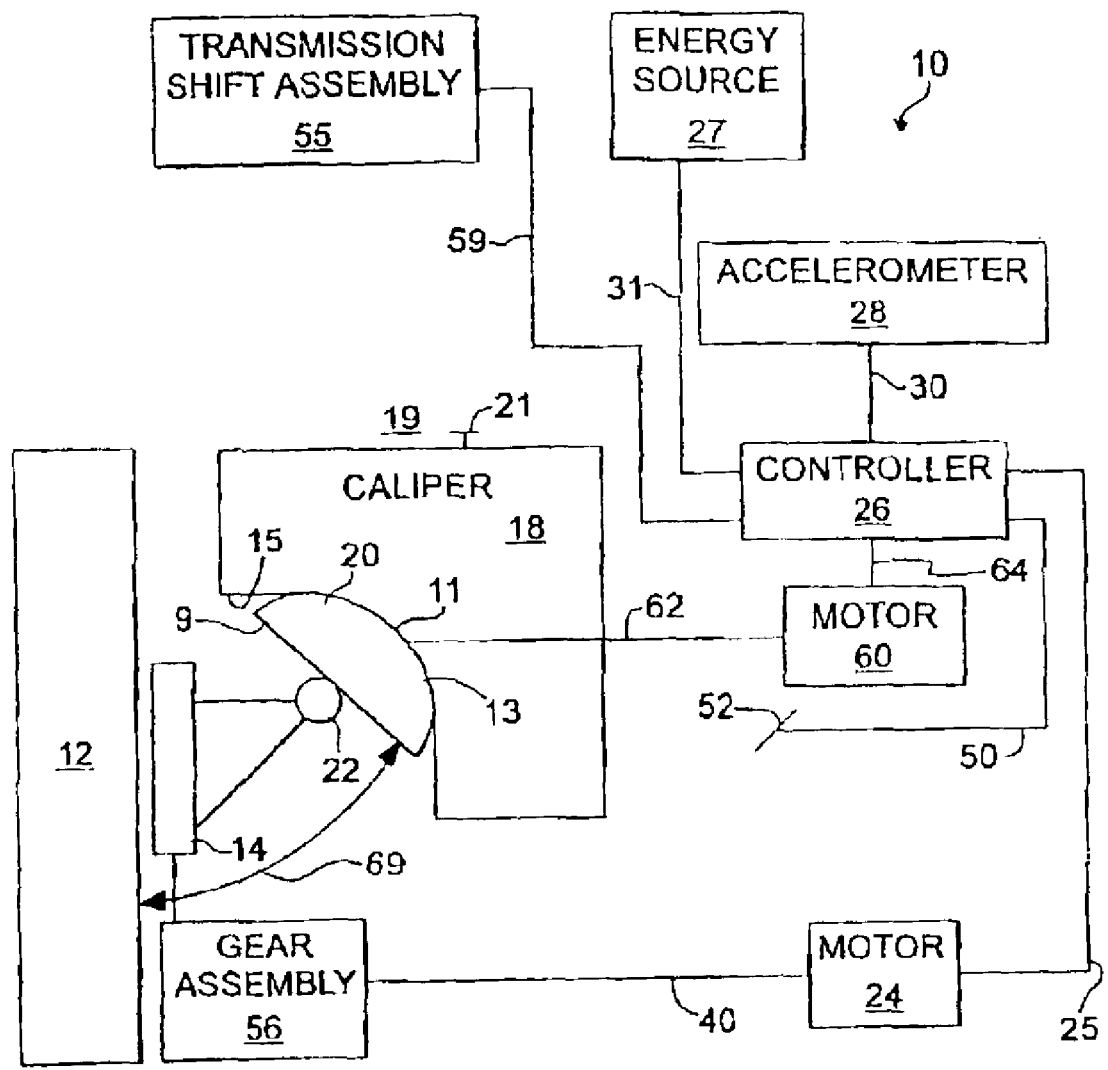
FIG. 1 is a block diagram of a self-energizing brake assembly which is made in accordance with the teachings of the preferred embodiment of the invention.

Referring now to FIG. 1, there is shown a controllably varying self-energizing brake assembly 10 which is made in accordance with the teachings of the preferred embodiment of the invention.

Particularly, the brake assembly 10 includes a rotor 12 which moves with and which is coupled to a wheel (not shown) of the selectively movable assembly and at least one pad or pad assembly 14. At the outset, it should be appreciated that the brake assembly 10 may employ several rotors 12 and/or pad assemblies 14 and/or wedges or a single rotor 20 and pad assembly 14 and wedge and that the present invention is not limited to a particular pad and/or rotor and/or wedge configuration. It should be further appreciated that the brake assembly 10 may be operatively deployed within a vehicle or other selectively movable assembly and that each selectively movable wheel of a vehicle may have and may be operatively coupled to a unique brake assembly 10.

Further, the brake assembly 10 includes a caliper assembly or member 18 which is coupled to the body 19 of the moving assembly by a conventional fastener or fastener assembly 21, a selectively movable wedge or self-energization member 20 which is received in a pocket 15 of the caliper assembly 18. Particularly, the pocket 15 generally conforms to the generally round shape of the back portion 13 of the wedge member 20 and, in one embodiment, back portion 13 abuttingly engages the surface 11 of the pocket 15. The brake assembly 10 further includes, a pin or pin assembly 22 which is coupled to the pad assembly 14 and which is coupled to the front position 9 of the wedge member 20. In this manner, the wedge portion 20 may rotate about the pin or pin assembly 22. However, since the back portion 13 is received within the pocket 15 and abuttingly engages the surface 11, the wedge 20 is usually stationary with respect to the caliper body 18 unless purposefully and controllably moved by an external force.

The brake assembly 10 further includes, a first actuating force generator or motor 24, a controller or controller assembly 26 which is operable under stored program control and which is physically and controllably coupled to the motor 24 by bus 25, and an accelerometer 28 which is physically and communicatively coupled to the controller assembly 26 by the use of the bus 30. The controller assembly 26 is further coupled to a source of electrical energy 27 by the use of bus 31. In one non-limiting embodiment of the invention, the brake assembly 10 may also include a gear assembly 56.

As is further shown, the motor 24 has a selectively movable output shaft 40 which, in one non-limiting embodiment, is coupled to the gear assembly 56 which, upon receipt of torque from the shaft 40, causes the pad assembly 14 to engage the rotor assembly 12 in a direction which is dependent upon the direction that the output shaft 40 is rotating. It should be understood that the gear assembly 56 shown in FIG. 1 may comprise an intermediate gear (not shown) and a screw actuator (not shown) which may selectively and cooperatively cause the pad assembly 14 to engage the rotor assembly 12 in a direction which is dependent upon the direction that the output shaft 40 is rotating. It should further be understood that the gear assembly shown in FIG. 1 is for illustrative purposes only and that nothing in this description is meant to limit the actuation means of brake pad 14 to such a gear assembly. Rather, output shaft 40 may, in one non-limiting embodiment, selectively actuate the brake pad 14 without the usage of gear assembly 56 by the use of any desired and conventional actuation means. For example and without limitation, the gear assembly 56 may be substantially similar to the gear assembly which is described within European patent Number EP 0953785A3 which is fully and completely incorporated herein by reference, word for word and paragraph for paragraph. For example, in this non-limiting embodiment, the gear assembly 56 may include a pinion (not shown) which is coupled to the output shaft 40 and which is in engagement with toothing (not shown) which is formed on the radially inner circumference of the pad assembly 14 (i.e., toothing formed on a backing plate (not shown) which is coupled to the pad assembly 14). The pinion and toothing cooperatively and selectively causes the pad assembly 14 to engage the rotor assembly 12 in a direction which is dependent upon the direction that the output shaft 40 is rotating.

Further, as shown, the controller assembly 28 is physically and communicatively coupled to a selectively depressible brake member 52 by the use of bus 50 and to a transmission shift assembly 55 by the use of bus 59. The assembly 10 also includes a second motor 60 which has an output shaft 62 which selectively engages the wedge member 20. The second motor 60 is physically and controllably coupled to the controller assembly 26 by the use of the bus 64. It should be appreciated that each selectively movable wheel (not shown) of the selectively movable assembly may have a brake assembly which is substantially identical to brake assembly 10.

In operation, the controller 26 senses the depression of the brake member 52, by the use of the bus 50, and the currently desired direction of the moving assembly that the braking assembly 10 is operatively deployed within, by the use of bus 59. The controller assembly 26 causes the pad 14 to be moved in a direction which is dependent upon this sensed direction. That is, if the moving assembly is moving in the "forward" direction or is in drive state or mode of operation, the controller 26 sources electrical power, from the energy source 27, to the motor 24, by the use of buses 31 and 25 and this sourced energy causes the output shaft 40 to rotate by a certain amount and by a certain speed in a clockwise manner, effective to provide a certain actuating force which is effective to cause the pad assembly 14 to engage both the rotor 12 and the "forward" wedge by a certain amount, thereby braking and decelerating the moving assembly. Should the sensed direction be in a "reverse" direction, the output shaft 40 is made to rotate in a counterclockwise direction, thereby causing the pad assembly 14 to engage the rotor 12 and the "reverse" wedge by a certain amount. It should be appreciated that the aforementioned description of operation describes a "dual" wedge braking system and that nothing in this description is meant to limit the braking assembly 10 to the "dual" wedge design or architecture. Rather, braking assembly 10 may, in one non-limiting embodiment of the invention, comprise a "single" wedge design or architecture. That is, in this non-limiting "single wedge" embodiment, motor 24 will selectively move the brake pad assembly 14 in an upward direction to apply a braking force and motor 24 will move the brake pad assembly 14 in a downward direction to reduce braking force. It should also be appreciated that, in this non-limiting embodiment, the motor will operate in a single direction (i.e., always clockwise or always counter-clockwise) to apply braking, regardless of the direction of rotor 12. However, while this architecture does provide braking, it will provide much less self-energization in one direction (i.e., a backward direction) than in the other (i.e., forward direction). This lower amount of self-energization in the backward direction is due to the friction force acting against the motor force. It should be further appreciated that the direction of rotation of the motor shaft 40 is dependent upon the phase of the electrical power signal which is communicated to the first motor 24 from the energy source 27 and through busses 31, 25 and the controller assembly 26. That is, a first phase arrangement produces shaft movement in a clockwise direction while a second phase arrangement produces shaft movement in a counter clockwise direction. In one non-limiting embodiment of the invention, controller assembly 26 adjusts the signal phase as needed. Further, the amount of actuation force is dependant upon the torque transmitted-through the output shaft 40 and the output torque is dependent upon the electrical power signal being communicated to motor 24, such a signal being controlled by the controller assembly 26. It should be understood that the present invention is not limited to a particular type of motor 24. Rather, substantially any desired type of motor which provides a controllable amount of torque may be utilized in brake assembly 10.

Particularly, the amount of required braking or actuation force is determined by the position of the brake member 52 and the amount of gain provided by the member 20. That is, the position of the brake member 52 is associated with the total required amount of desired braking. In one embodiment, a lookup table may be created and stored within the controller assembly 26 which associates various positions of the member 52 with a unique amount of requested braking force. A positional value, which is not stored within the look up table, may have a braking value associated with it and, such a braking value is, in one embodiment, equal to the braking value associated with the stored braking position value which is closest to the currently measured positional value. Alternatively, the value may be calculated by a conventional interpolation method. The gain is dynamically controllable in a manner to be discussed and each position of the wedge 20 provides a calibratable amount of gain. Hence, the controller assembly 26, upon the ascertainment of the position of the wedge member 20 and the ascertainment of the position of the braking member 52, may modulate or vary the amplitude and phase of the power being supplied to the output shaft 40. It should be appreciated that in the preferred embodiment of the invention, the system can operate in either a compression or a tension mode and is operable in either a forward or a reverse direction. In one non-limiting embodiment, the controller assembly 26 continually determines or ascertain the position of the wedge member 20. For example, the position of the wedge member 20 is continually monitored by controller 26, either by use of a sensor (not shown) or by calculating the position of the member 20 by the use of a known initial position and the amount of force applied (and the time with which that force has been applied) to the member 20.

In operation, the accelerometer 28 continually measures (e.g., at periodic intervals of time) the amount of vehicular deceleration and provides this information to the controller assembly 26, by the use of bus 30. The controller assembly 26 uses the amount of received deceleration to dynamically calculate an optimal wedge angle of inclination 69 (provided by the front portion 9) (i.e., the angle between the wedge and the rotor face), effective to ensure that a relatively high amount of self-energization is always provided by the brake assembly 10. That is, the wedge angle 69 is controllably varied with each measured change of vehicular deceleration, thereby always ensuring that a relatively large self-energization gain is present, thereby reducing the power required by the first or actuating motor 24.

Particularly, the wedge 20 is moved by the selective energization of the second motor 60, thereby allowing the output shaft 62 to rotate by a certain amount in a certain desired direction, thereby allowing the wedge member 20 to move in a certain direction and dynamically adjusting the amount of provided self-energization. The energization of the shaft 62 (motor 60) occurs when the controller 26 sources power from the power source 27 to the motor 60 through busses 31, 64. Particularly, the wedge angle 69 or α may be calculated by the following equation:

$$\text{Tan}(\alpha) = \frac{(\text{input force})\mu}{(\text{output force})} + \mu \qquad \text{(Equation 1)}$$

where: $\mu$=coefficient of friction between the pad assembly 14 and the rotor 12 output force=frictional force acting on the rotor 12 input force=force provided by motor 24 acting on the pad assembly 14.

The output force for a vehicle may be calculated as follows: output force (front)=$0.5*F \times b \times R/_{rf}$ (Equation 2) output force (rear)=$0.5*F \times (1-b) \times R/_{rf}$ (Equation 3) where F is the decelerative force; R is the radius of the tire (not shown) which is coupled to the wheel to which the brake assembly 10 is attached; "rf" is the effective radius of the caliper 18; and b is the desired percentage of total braking force generated by the front tires. Hence, it should be realized that the foregoing brake assembly has a dynamically or controllably varying amount of self-energization (e.g., the wedge angle 69 may be dynamically varied), thereby allowing a consistently high level of self-energization to be maintained for all operating conditions. The consistently high level of self-energization allows the controller 26 to optimize the power consumption of the brake system. This arrangement also allows for the use of a relatively small, lightweight, low cost, and low powered motor 24.

Figure 2:
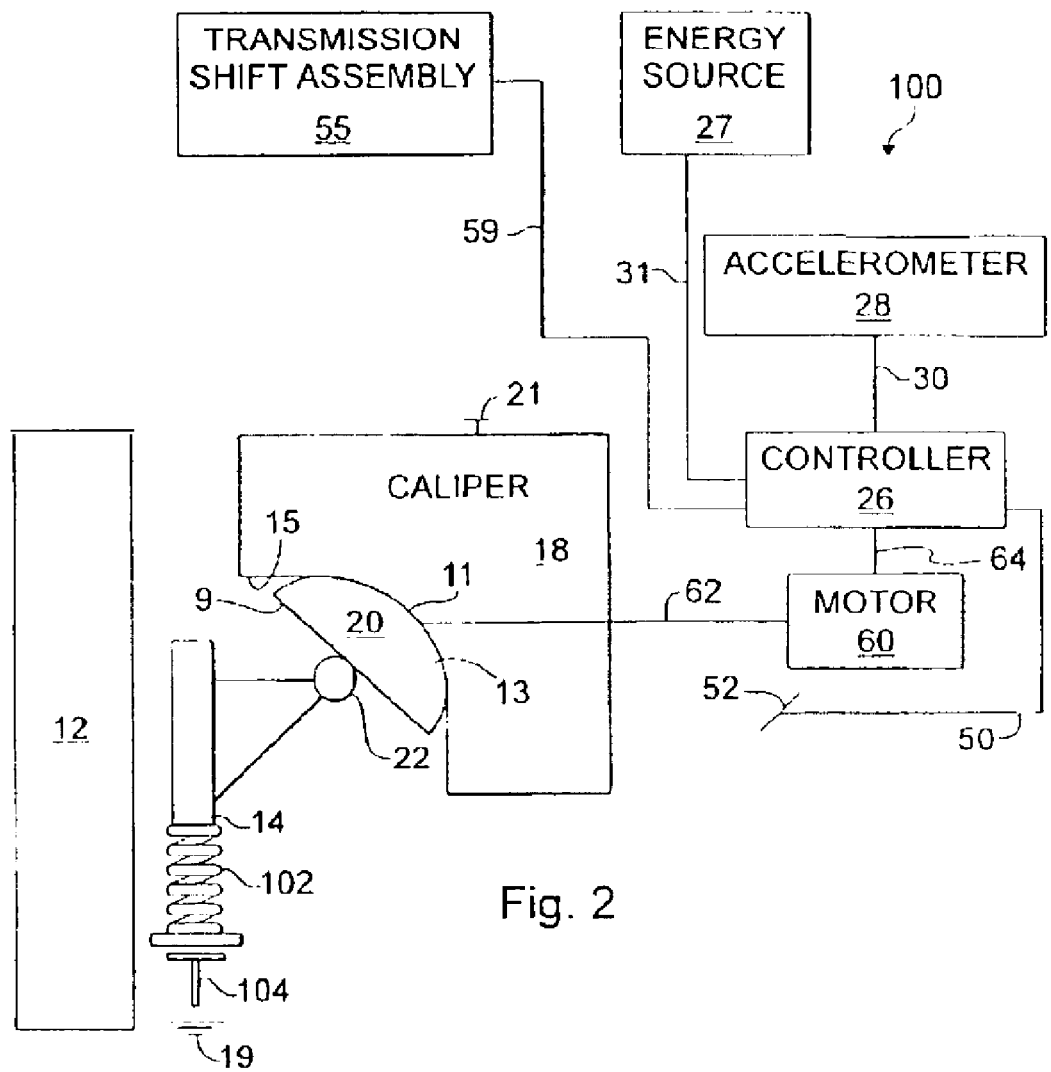
FIG. 2 is a block diagram of a self-energizing brake assembly which is made in accordance with the teachings of an alternate embodiment of the invention.

In a second non-limiting embodiment of the invention, a braking assembly 100 may be provided in which the pad assembly 14 is coupled to a biasing spring 102 which is mounted to the body 19 of the selectively movable assembly by a fastener assembly 104. In this embodiment, as represented by brake assembly 100 of FIG. 2, the brake assembly 100 is braked only by a change in the angle of the wedge member 20 due to a selective energization of the motor 60, thereby obviating the need for motor 24.

It is to be understood that the invention is not limited to the exact construction and methodology which is set forth above, but that various changes and modifications may be made without departing from the spirit and the scope of the inventions as is further delineated in the following claims.

What is claimed is:

1. A brake assembly including a selectively movable member providing a variable angle of inclination which varies in response to a variance in friction between a brake rotor and a pad; and a controller assembly, which is coupled to said selectively movable member, which selects a certain amount of self-energization, and which moves said selectively movable member by a certain amount in order to cause said member to provide said certain selected amount of self-energization.

2. The brake assembly of claim 1 wherein said member comprises a wedge.

3. The brake assembly of claim 1 wherein said brake assembly further includes a pin about which said wedge selectively rotates and which is coupled to said pad.

4. The brake assembly of claim 1 wherein said pad is biased against said rotor by a biasing spring.

5. The brake assembly of claim 1 further comprising a motor assembly which is coupled to said controller and to said selectively movable member.

6. The brake assembly of claim 5 wherein said brake assembly further comprises an intermediate gear portion and a screw actuator which is coupled to said motor assembly.

7. A brake assembly comprising a rotor member; a pad member which may selectively engage said rotor member, thereby generating a certain amount of friction; a wedge member, and a controller which measures said certain amount of friction further and, in response to said measurement, rotates said wedge member by a certain amount, with said brake assembly further comprising a motor which is coupled to said controller and to said pad member by means of a gear assembly comprising an intermediate gear portion and a screw actuator, with the motor and gear assembly causing said pad member to selectively engage said rotor and said wedge member.

8. The brake assembly of claim 7 further including a caliper which has a pocket portion which operatively receives said wedge member.

9. The brake assembly of claim 7 wherein said brake assembly further includes a biasing spring which is coupled to said pad member and which biases said pad member against said wedge member.

10. A method for braking a vehicle comprising the steps of sensing a desired amount of braking; providing a certain actuation force; selecting a certain amount of self-energization; providing said certain amount of self-energization; using said provided actuation force and said certain amount of self-energization to brake said vehicle, where said step of providing said certain amount of self-energization comprises the steps of providing a wedge member; and, moving said wedge member to cause said wedge member to provide a certain angle of inclination, effective to provide a certain amount of self-energization.

11. The method of claim 10 wherein said step of providing an actuation force comprises the steps of providing a motor; and causing said motor to provide said actuation force.

12. The method of claim 10 wherein said step of sensing a desired amount of braking comprises the steps of providing a selectively movable braking member; and sensing an amount of movement of said selectively movable braking member.

13. The method of claim 10 further comprises the step of providing a biasing spring; and coupling said biasing spring to said pad member, effective to bias said pad member against said wedge member.

* * * * *